Dec. 8, 1936.   R. F. PEO   2,063,619
HYDRAULIC SHOCK ABSORBER
Filed Jan. 24, 1935   2 Sheets-Sheet 1
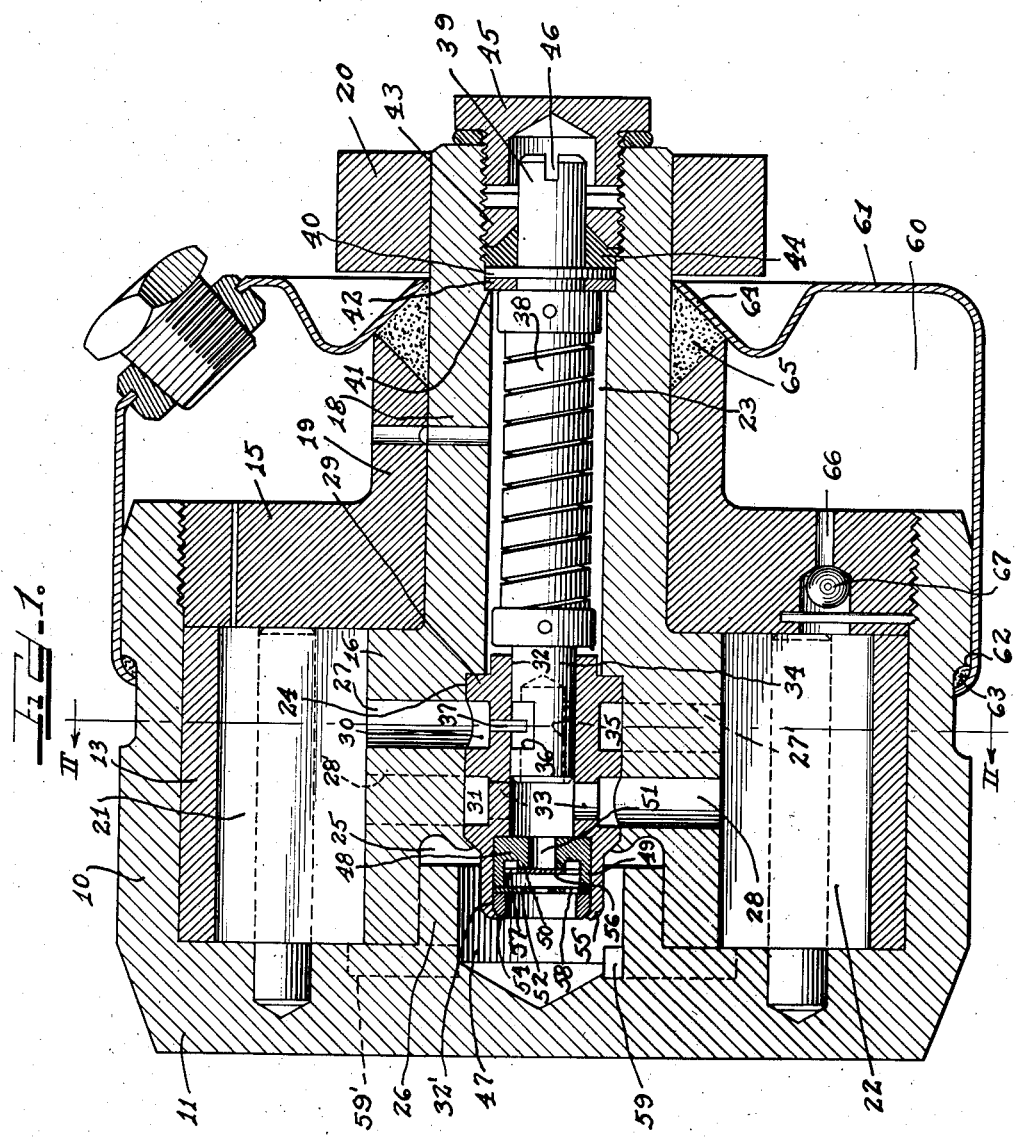
Inventor
Ralph F. Peo.
by Charles H. Wills Attys.

Dec. 8, 1936.  R. F. PEO  2,063,619
HYDRAULIC SHOCK ABSORBER
Filed Jan. 24, 1935  2 Sheets-Sheet 2
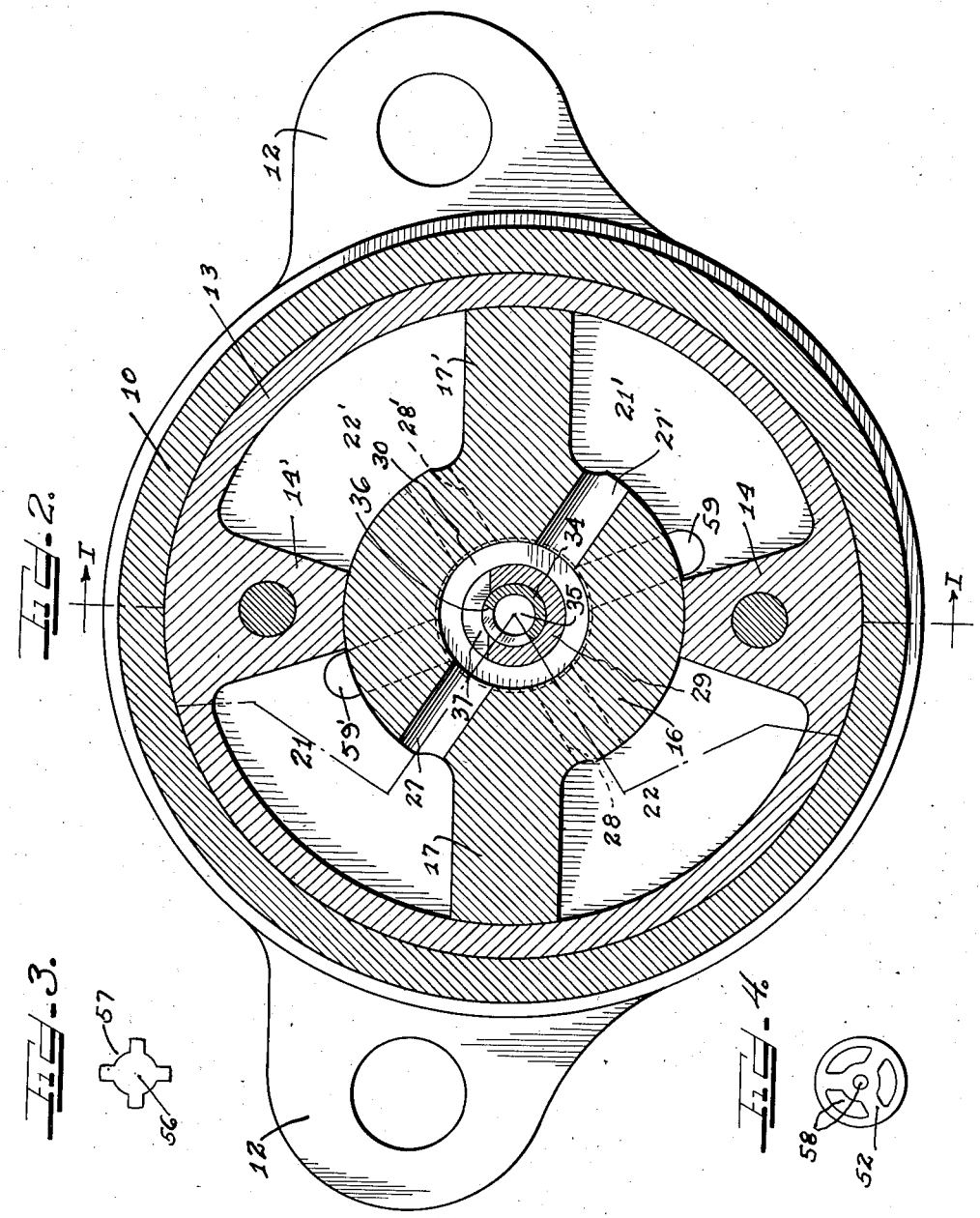
Inventor
Ralph F. Peo.
by Charles W. Hills Attys Patented Dec. 8, 1936

2,063,619

UNITED STATES PATENT OFFICE 2,063,619

HYDRAULIC SHOCK ABSORBER

Ralph F. Peo, Buffalo, N. Y., assignor to Houde Engineering Corporation, Buffalo, N. Y., a corporation of New York Application January 24, 1935, Serial No. 3,233

5 Claims. (Cl. 188—89)

My invention relates to hydraulic shock absorbers and particularly to improved valving assembly and arrangement for metering and controlling the fluid flow from one side to the other of a piston structure operating in a hydraulic chamber.

The invention is particularly advantageous in hydraulic shock absorbers provided with a comparatively low resistance passage for the flow of displaced hydraulic fluid during compression movement of spring structures with which the shock absorber is associated, and a more restricted passage for the flow of fluid during the rebound movement of the spring structures to be controlled. At very low temperature the hydraulic fluid may become of semi-solid consistency, and where the high and low resistance passages are more or less remote from each other in the shock absorber structure, the semi-solid fluid must be broken up at different localities to a thick liquid consistency before it can flow efficiently through the passages for the required shock absorbing action. Where the low resistance passage, usually controlled by check valve means, and the high resistance passage, usually controlled by adjustable valve means, are more or less remote from each other, the semi-solid fluid is broken up into little pools of more mobile fluid by flow through the passages during operation of the shock absorber, and it requires an appreciable time and a definite number of strokes of the shock absorber piston before these pools unite and all the fluid becomes of liquid consistency and the shock absorber resistance drops down to a constant normal running resistance at the particular low temperature.

I have found that where the high and low resistance passages and their controlling valve means are brought close together the shock absorber more quickly assumes its normal and proper functioning under the low temperature to which it is subjected, and it is therefore an important object of my invention to provide an improved assembly and arrangement in which the passages and the controlling valve means are brought into close proximity so that the fluid of semi-solid consistency which is broken down to more liquid consistency upon flow through one of the passages may immediately flow through the other passage as the shock absorber piston structure changes its direction of motion, and it will not therefore be necessary for the entire fluid in the shock absorber working chambers to become broken up to more liquid consistency before the shock absorber can assume its normal efficient operation.

My invention involves other features of construction and arrangement as will be apparent from the following specification taken in connection with the drawings, in which drawings:

Figure 1 is a diametral sectional view on plane I—I of Figure 2 of a hydraulic shock absorber;

Figure 2 is a sectional view on plane II—II of Figure 1;

Figure 3 is a plan view of a check valve; and

Figure 4 is a plan view of the stop disc for the check valve.

The shock absorber structure shown is of a well known type in which radial vanes on an oscillating shaft displace hydraulic fluid between the partitions extending radially from a cylindrical housing. Heretofore in this type of shock absorber one arrangement has been to provide a manually or automatically adjustable valve in a bore in the shaft for controlling the high resistance flow through passageways extending through the piston hub, and check valve controlled passages located either in the partition or in the piston vanes for controlling the lower resistance flow.

In accordance with my present invention all the valves are arranged within the piston hub with the control passages close together.

The shock absorber disclosed on the drawings comprises a casing or body having a cylindrical peripheral wall 10 and the inner end wall or base 11 integral therewith, this base 11 being provided with perforated ears 12 by means of which the shock absorber structure may be supported, as on the chassis of an automobile vehicle. A cylindrical ring 13 fits in the peripheral wall 10 and abuts the base 11 and has the diametrically opposite partitions 14 and 14' extending radially inwardly. The outer end wall or cover structure 15 is secured by threading into the end of the wall 10 and abuts the ring 13 and the partitions 14 and 14'.

A piston hub 16 has the piston vanes 17 and 17' extending between the partition lugs 14 and 14', the hub having the shaft 18 extending therefrom journalled in the end wall 15 and the bearing extension 19 thereon, the outer end of the shaft mounting an arm or lever 20 for connection with the axle of a vehicle so that during running of the vehicle the shaft will be oscillated for movement of the piston vanes to displace hydraulic fluid within the space formed by the ring 13 and the walls 11 and 15. The piston structure and partitions divide this space into the high pressure working chambers 21 and 21' and the low pressure chambers 22 and 22'.

The piston shaft has the axially extending bore 23 which terminates at its inner end at the bore 24 of larger diameter in the piston hub 16, said hub at its inner end having the cylindrical pocket or recess 25 having bearing engagement on the annular bearing lug 26 extending from the base wall 11. Passageways 27, 27' extending radially through the hub 16 connect the high pressure working chambers 21 and 21' with the bore 24, the radial passageways 28 and 28' through the piston hub connecting the low pressure chambers 22 and 22' with the bore 24. Rigidly mounted in the bore 24 is a valve supporting and seating structure in the form of a bushing 29 which has the annular peripheral channel 30 in communication with the passages 27 and 27', and the adjacent annular peripheral channel 31 in communication with the passages 28 and 28'.

In the outer portion of the seat member 29 is the axial bore 32 and at the inner end thereof is the bore 32' of larger diameter. At its inner end the bore 32 is connected with the annular channel 31 by one or more ports 33 through the wall of the seat member 29. In the outer end of the bore 32 a cylindrical valve plug 34 is seated which in its inner portion has the axial bore or passageway 35 communicating with the inner end of the bore 32 which is connected by the port 33 with the annular channel 31 and the passages 28 and 28' leading to the low pressure chambers.

The valve plug 34 is transversely milled on one side to provide a port 36 for cooperation with the orifice slit 37 extending a distance circumferentially in the wall of the seat member 29 and communicating with the channel 30 which communicates with the passages 27 and 27' communicating with the high pressure working chambers 21 and 21'. Upon rotation of the valve plug more or less of the orifice slit 37 is exposed to the valve port 36 and the flow of fluid from the high pressure chambers to the low pressure chambers during rebound movement of the vehicle spring is thus metered and the flow resistance determined. The flow from the high pressure chambers through the orifice slit and the valve port is into the valve bore 35 and from there through the ports 33 and passages 28 and 28' to the low pressure chambers.

As shown, the valve plug is adapted for manual adjustment or setting and for automatic adjustment in accordance with change of temperature of the hydraulic fluid. A thermostat coil 38 located in the shaft bore 23 is secured at its inner end to the valve plug and at its outer end to a head 39. The head has a flange 40 between which and the abutment shoulder 41 is interposed a washer 42. An annular plug 43 threads into the outer end of the bore 23 and engages packing material 44 which is pressed against the bore sides and the flange 40 to hold the head 39 firmly seated in adjusted position and to prevent leakage of hydraulic fluid. A suitable plug 45 closes the outer end of the bore. The head 39 has a screw driver slot 46 by means of which it may be readily turned for manual setting of the valve plug and thereafter the thermostat coil 38 will automatically adjust the valve in response to temperature change of the hydraulic fluid, the valve being turned by the thermostat for further restriction of the orifice slit 37 as the temperature rises and the fluid becomes less viscous, the valve being turned in the opposite direction for greater exposure of the orifice slit as the temperature decreases and the viscosity of the fluid rises.

The inner end of the seating member 29 projects into the space 47 surrounded by the bearing lug 26 on the base wall 11. At the bottom of the inner bore 32' of the valve seat bushing is the valve seat member 48 having the outer flange 49 and having an inner flange 50 surrounding the end of the axial passage 51 which communicates with the inner end of the bore 32. A stop disc 52 seats against the end of the flange 49 and is there held by a retaining ring 54 which is secured in place preferably by deflecting over the inner edge of the valve seat member or bushing 29, as indicated at 55. Between the stop disc 52 and the flange 50 is the disc valve 56 for which the end of the flange 50 forms a seat. The valve disc 56 has its periphery cut away to leave ports 57 through which fluid may flow when the valve is unseated, and the stop disc 55 has ports 58 therethrough.

Grooves or channels 59 and 59' cut in the base wall 11 connect the high pressure chambers 21 and 21' respectively with the space 47 surrounding the inner end of the seating bushing 29. During the movement of the piston structure by the rebound movement of the vehicle springs, the displaced fluid flows from the high pressure chambers to the low pressure chambers by way of the passages 27, 27', the orifice slit 37 and the valve port 36, and the passages 28 and 28', as has already been explained. During such piston movement part of the displaced fluid tends to escape through the channels 59 and 59', but the pressure of such fluid against the valve disc 56 will hold the valve disc against its seat 50 so that the passageway 51 is closed, and therefore fluid flow from the high pressure chambers to the low pressure chambers can be only by way of the metering passageway provided by the orifice slit 37.

During movement of the piston structure upon compression of the vehicle springs, a small part of the displaced fluid flows from the low pressure chambers to the high pressure chambers by way of the orifice slit 37, but most of the displaced fluid will unseat the disc valve 56 and flow through the passageway 51, the valve ports and ports of the stop disc 52, and the channels 59 and 59' to the high pressure chambers. The disc 56 thus acts as a check valve for checking flow from the high pressure chambers to the low pressure chambers but permitting flow in reverse direction, the stop disc 52 limiting the unseating movement of the valve disc. The passageway or port 51 meters and practically determines the resistance to flow from the low pressure to the high pressure chambers during compression movement of the vehicle spring.

With my improved arrangement the various fluid flow metering ports and their associated valve mechanisms are in close proximity to each other and all contained within the piston structure. With this compact and intimate arrangement the fluid of semi-solid consistency, which is broken up into more liquid form upon passage in one direction through the ports or passages, is immediately returned through such passages as the piston structure changes its direction of movement and the proper shock absorber resistance is built up practically immediately without having to wait for the breaking up of the entire fluid. There is a further advantage in locating the metering passageways and the controlling valve structures close together within the bore of the piston hub, as at that point the hydraulic fluid is less exposed to low external temperature and will retain its liquid condition much longer than the fluid outside of the piston structure.

A fluid replenishing chamber 60 is formed by the application of a cup 61 which receives the outer end of the annular wall 10 and is deflected around a shoulder 62 with packing material 63 intervening. The bottom of the cup has an opening through which the shaft 18 extends, and the deflection 64 in the cup bottom cooperates with the beveled end of the bearing extension 19 to form a pocket for receiving packing material 65. The replenishing chamber is connected with the working chambers by passages 66 through the end wall 15, which passages are controlled by check valves such as balls 67.

I have shown a practical and efficient embodiment of the various features of my invention, but I do not desire to be limited to the exact construction, arrangement and operation shown and described as changes and modifications are possible which will still come within the scope of the invention.

I claim as follows:

1. In a hydraulic shock absorber, a casing providing high and low pressure hydraulic working chambers, a piston structure comprising a hub and a shaft extending therefrom, said hub having vanes thereon for displacing the hydraulic fluid in said chambers, said hub and shaft having an axial bore extending therethrough, passageways in said hub communicating with said working chambers, a bushing seated in the hub end of said bore to be interposed between said passages, a valve operable in said bushing to control the flow of fluid from the high pressure to the low pressure chambers, thermostatic means in the shaft end of said bore for automatically controlling said valve, and another valve in said bushing operable to control the flow from the low pressure to the high pressure chambers.

2. In a hydraulic shock absorber, a casing providing high pressure and low pressure hydraulic working chambers, a piston structure extending axially in said casing and having vanes thereon for displacing the hydraulic fluid, said piston structure having an axial bore, a bushing in said bore providing an outer valve chamber and an inner valve chamber and an intermediate chamber, said outer valve chamber being connected with the high pressure working chambers, said intermediate chamber being connected with the low pressure working chambers, an adjustable valve in said outer valve chamber controlling the flow from the high pressure to the low pressure chambers, a check valve in said inner valve chamber, a port connecting said inner valve chamber at one side of said check valve with said intermediate chamber, and a passage connecting with said inner valve chamber at the other side of said check valve with said high pressure chambers, said check valve being arranged to open for flow of fluid from the low pressure chambers through said intermediate chamber and said ports and passage to said high pressure chambers but being closed by the pressure of the fluid from the high pressure chambers during flow of fluid from the high pressure chambers to the low pressure chambers.

3. In a hydraulic shock absorber, a casing providing high and low pressure hydraulic working chambers, a piston structure comprising a hub and a shaft extending therefrom, said hub having vanes thereon for displacing the hydraulic fluid in said chambers, said hub and shaft having an axial bore extending therethrough, passageways in said hub communicating with said working chambers, a bushing seated in the hub end of said bore to be interposed between said passages, a rotary valve operable in one end of said bushing to control the flow of the high pressure chambers to the low pressure chambers, and a check valve movable axially in the other end of said bushing for controlling the flow from the low pressure chambers to the high pressure chambers.

4. In a hydraulic shock absorber, a casing providing high and low pressure hydraulic working chambers, a piston structure comprising a hub and a shaft extending therefrom, said hub having vanes thereon for displacing the hydraulic fluid in said chambers, said hub and shaft having an axial bore extending therethrough, passageways in said hub communicating with said working chambers, a bushing seated in the hub end of said bore to be interposed between said passages, a thermostatically controlled rotary valve operable in one end of said bushing to control the flow of the high pressure chambers to the low pressure chambers, and a check valve movable axially in the other end of said bushing for controlling the flow from the low pressure chambers to the high pressure chambers.

5. In a hydraulic shock absorber, a casing providing high and low pressure hydraulic working chambers, a piston structure extending axially in said casing and having vanes thereon for displacing the hydraulic fluid, said piston structure having an axial bore, a bushing in said bore providing an outer valve chamber and an inner valve chamber and an intermediate chamber, said outer valve chamber being connected with the high pressure working chambers, said intermediate chamber being connected with the low pressure working chambers, a valve in said outer valve chamber for controlling the flow from the high pressure to the low pressure chambers, a check valve in said inner valve chamber, said inner valve chamber being connected at opposite sides of said check valve with said intermediate chamber and said high pressure working chambers respectively, and said check valve being arranged to operate to prevent flow from said high pressure working chambers to said intermediate chamber during movement of said piston structure in one direction but to permit flow from the intermediate chamber to the high pressure working chambers during movement of the piston structure in the opposite direction.

RALPH F. PEO.